United States Patent
Terre et al.

(10) Patent No.: US 7,402,802 B1
(45) Date of Patent: Jul. 22, 2008

(54) INFRARED CAMERA PACKAGING SYSTEMS AND METHODS

(75) Inventors: William A. Terre, Santa Barbara, CA (US); Vu Nguyen, Goleta, CA (US)

(73) Assignee: Flir Systems, Inc., Wilsonville, OR (US)

( * ) Notice: Subject to any disclaimer, the term of this patent is extended or adjusted under 35 U.S.C. 154(b) by 0 days.

(21) Appl. No.: 11/551,133

(22) Filed: Oct. 19, 2006

(51) Int. Cl.
*G01J 5/00* (2006.01)
(52) U.S. Cl. .................... 250/330; 250/338.1
(58) Field of Classification Search .......... 250/330, 250/338.1, 351, 353
See application file for complete search history.

(56) References Cited

U.S. PATENT DOCUMENTS 7,030,378 B2 4/2006 Allen et al.
2002/0162963 A1* 11/2002 Lannestedt et al. .......... 250/351

* cited by examiner

*Primary Examiner*—David P. Porta
*Assistant Examiner*—Mark R Gaworecki
(74) *Attorney, Agent, or Firm*—MacPherson Kwok Chen & Heid LLP; Greg J. Michelson

(57) ABSTRACT

Systems and methods are disclosed herein to provide improved techniques for assembling and packaging infrared camera components. For example, in accordance with an embodiment of the present invention, an infrared camera includes a housing having a plurality of holes, with a shutter, a lens, an infrared detector, and a first spacer disposed within the housing. The first spacer is secured within the housing by an adhesive disposed in one or more of the holes of the housing.

24 Claims, 4 Drawing Sheets

INFRARED CAMERA PACKAGING SYSTEMS AND METHODS

TECHNICAL FIELD

The present invention relates generally to infrared cameras and, more particularly, to packaging techniques for infrared cameras.

BACKGROUND

Infrared cameras are increasingly used for a wide variety of applications. As infrared cameras grow in popularity, the ability to manufacture the infrared cameras in a cost-effective, efficient, and/or high-volume manner becomes increasingly important.

Infrared cameras are typically manufactured by independently securing various components within the infrared camera housing. For example, an infrared sensor (e.g., within a vacuum package) would be mechanically secured with fasteners and electrically connected to electronics within the infrared camera housing. The lens would also be securely mounted independently within the infrared camera housing with various types of fasteners and aligned with the infrared sensor. Similarly for example, a shutter (e.g., a calibration flag) would also be securely mounted independently within the infrared camera housing with various types of fasteners (e.g., screws, pins, and/or bolts).

However, this conventional infrared camera packaging process is time consuming, labor intensive, and may adversely affect infrared camera performance. For example, failure to properly align the infrared sensor with the lens will result in infrared camera performance degradations. Furthermore, poor thermal management between the various components will result in temperature differentials and a decrease in infrared camera performance. As a result, there is a need for improved techniques for assembling and packaging infrared cameras.

SUMMARY

Systems and methods are disclosed herein to provide improved techniques for assembling and packaging infrared camera components. For example, in accordance with an embodiment of the present invention, an infrared camera is disclosed having a housing for various infrared camera components that may provide a more compact form, improved optical tolerances, and fewer fasteners and other hardware to assemble the infrared camera relative to conventional approaches. Furthermore, the housing may thermally protect the various components to provide a low thermally conductive outer shell, while the various components within may provide a high thermal conductance to maintain a uniform temperature with the infrared detector.

In accordance with one embodiment of the present invention, an infrared camera includes a housing having a plurality of holes; a shutter disposed within the housing; a lens disposed within the housing; an infrared detector disposed within the housing; and a first spacer disposed within the housing and between the lens and the infrared detector, wherein the first spacer is secured within the housing by an adhesive and/or an alignment pin disposed in corresponding one or more of the holes.

In accordance with another embodiment of the present invention, an infrared camera includes a shutter; a lens; an infrared detector; at least one spacer adapted to align the lens and the shutter with the infrared detector; a heat spreader coupled to the infrared detector; means for housing the shutter, the lens, the infrared detector, the at least one spacer, and the heat spreader; and means for securing the at least one spacer within the housing.

In accordance with another embodiment of the present invention, a method of assembling an infrared camera includes providing a housing having a plurality of holes; inserting a shutter into the housing; inserting a lens into the housing; inserting at least one spacer into the housing; inserting an infrared detector into the housing; and dispensing an adhesive into one or more of the holes to secure the shutter, the lens, the at least one spacer, and the infrared detector within the housing.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
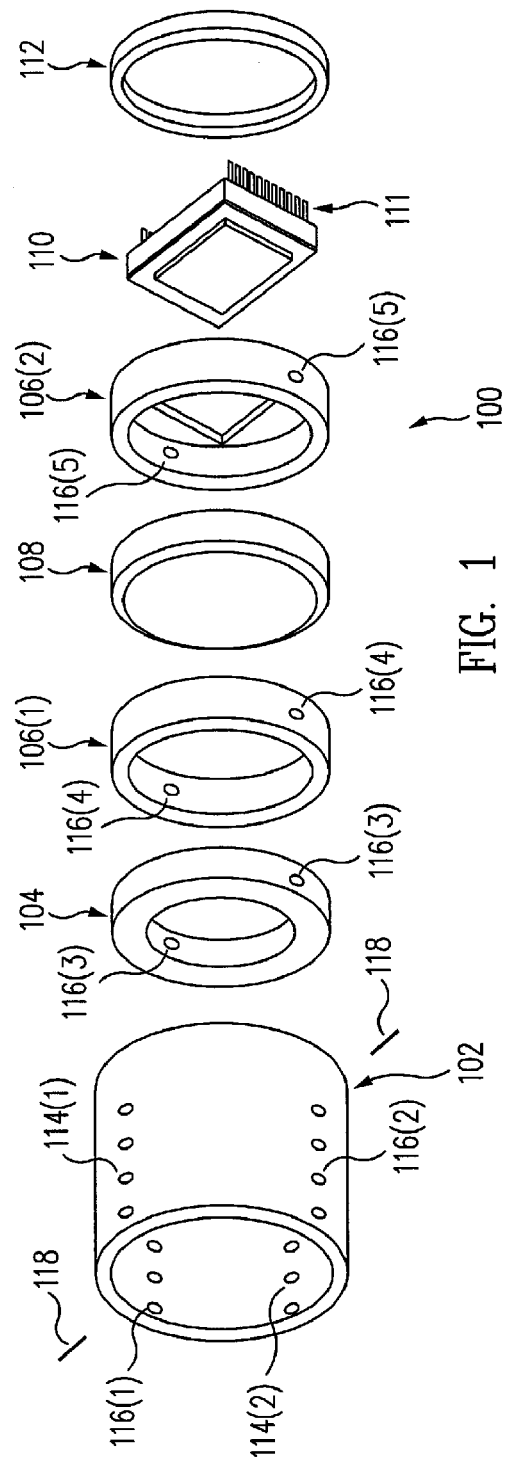
FIG. 1 shows a block diagram illustrating an exploded view of an infrared camera in accordance with an embodiment of the present invention.

FIG. 1 shows a block diagram illustrating an exploded view of an infrared (IR) camera 100 in accordance with an embodiment of the present invention. IR camera 100 (e.g., an infrared camera package) includes a housing 102, a shutter 104, spacers 106, a lens 108, an IR detector 110, and an insulator 112.

Housing 102 serves to enclose (at least substantially) shutter 104, spacers 106, lens 108, IR detector 110, and insulator 112. Housing 102 is shown as a circular hollow tube, but housing 102 may be square, hexagonal, or any other shape as desired for a specific application or design requirement. Furthermore, housing 102 may have an internal shape different than an external shape. For example, housing 102 may have a circular inner shape (e.g., tube shape), but housing 102 may have a square external shape or generally circular or partially square with one or more flat sides or surfaces (e.g., to provide appropriate external surfaces for mounting within an IR camera system incorporating IR camera 100.

Housing 102 may be made of a low thermal conductive material, such as for example plastic, to thermally couple the various components within housing 102 (e.g., to provide an extremely low thermal conductive external housing). Housing 102 may thermally interconnect the various components within housing 102. By maintaining approximately the same temperature of the various components within housing 102, IR detector 110 may be properly calibrated and may provide optimal performance without being influenced by out-of-field radiation from components within housing 102 that are at different temperatures (e.g., during calibration or normal camera operation).

As discussed further herein, housing 102 may include one or more adhesive holes 114 and pin holes 116, which may be used during the assembly process of IR camera 100. For example, adhesive holes 114 and pin holes 116 may be positioned singularly, in rows, randomly spaced, spaced evenly, or otherwise disposed around housing 102. As an example as shown, housing 102 has two rows of adhesive holes 114 (separately referenced as adhesive holes 114(1) and 114(2)) and two rows of pin holes 116 (separately referenced as pin holes 116(1) and 116(2)).

Pin holes 116 may be used with one or more alignment pins 118 to properly align the various components within housing 102. For example, spacer 106(1) and spacer 106(2) are shown with one or more pin holes 116(4) and 116(5), respectively, to receive alignment pins 118 inserted through pin holes 116(1) and/or 116(2) of housing 102 during the assembly process. However, various other components for assembly within housing 102 (e.g., IR detector 110 or insulator 112) may be implemented with pin holes 116. For example, shutter 104 may optionally provide pin holes 116(3) to receive alignment pins 118 inserted through pin holes 116(1) and/or 116(2) of housing 102 during the assembly process. Alignment pins 118 (e.g., pins, screws, bolts, or other types of fastening hardware) may be used for alignment purposes during assembly and then removed or left in permanently (e.g., secured with adhesive if not threaded, press fit, or secured by similar techniques) to strengthen and maintain alignment of the various components during the life of IR camera 100.

Adhesive holes 114 may be used with adhesive (e.g., a silicone adhesive that provides a low thermal conductance and allows expansion and contraction over a desired operating temperature range) to secure the various components within housing 102 during assembly. For example, an outer surface of spacer 106(1), spacer 106(2), and/or insulator 112 may receive adhesive inserted through adhesive holes 114(1) and/or 114(2) of housing 102 to secure an outer surface of these components to housing 102 during the assembly process. However, it should be understood that various other components for assembly within housing 102 may be further secured with adhesive, depending upon design requirements for securing the components within housing 102. For example, shutter 104 may be secured to housing 102 via adhesive holes 114 or alternatively, shutter 104 may be secured to spacer 106(1) (or spacer 106(2), depending upon its location as discussed further herein) with adhesive to secure the components within housing 102.

It should also be understood that pin holes 116 (e.g., pin holes 116(4) and/or 116(5)) may pass entirely through an outer and inner diameter of the component (e.g., spacers 106(1) and 106(2) as shown in FIG. 1) or may form only a depression and not pierce the inner diameter of the component to prevent foreign matter (e.g., thread filings, adhesive, dust, etc.) from entering the inner diameter and damaging certain components (e.g., lens 108) or potentially obscuring a field of view of IR detector 110.

Figure 2:
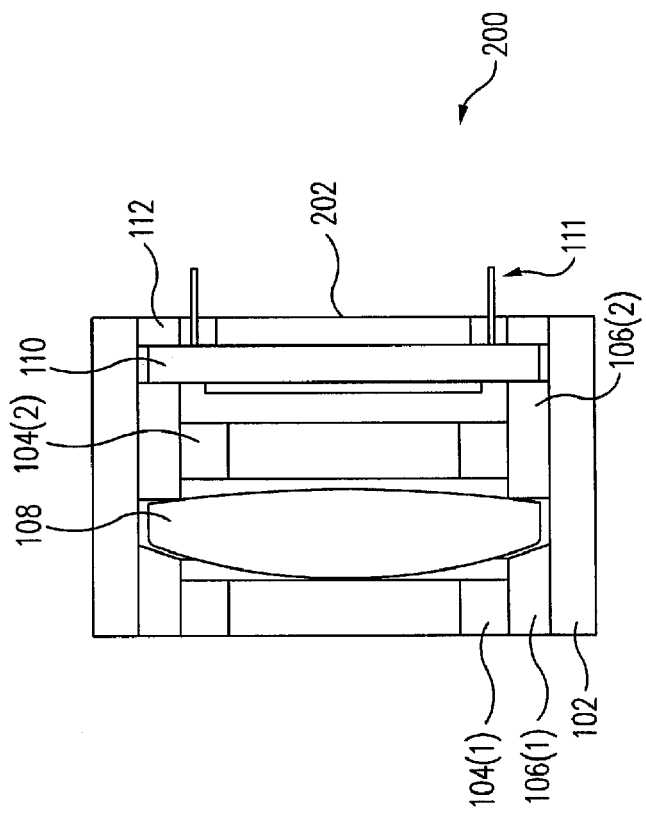
FIG. 2 shows a block diagram illustrating a cross-section of an infrared camera in accordance with one or more embodiments of the present invention.

Shutter 104 may represent, for example, a single and/or multi-blade shutter and may be positioned in the order shown in FIG. 1 (e.g., in front of lens 108) or alternatively as discussed in reference to FIG. 2 (e.g., between lens 108 and IR detector 110 as shutter 104(2)). As an example, shutter 104 may represent a temperature and uniformity-controlled shutter having one or more blades (e.g., a multi-blade iris). The shutter blades of shutter 104 may be motor, solenoid, and/or spring controlled and have high thermal conductance for a uniform temperature (e.g., made of metal, such as aluminum or titanium). Shutter 104 may also be actively controlled by an electrical heater for temperature and thermal uniformity.

One or more spacers 106 may be implemented within IR camera 100. For example as shown in FIG. 1, spacer 106(1) may be disposed between shutter 104 and lens 108, while spacer 106(2) may be disposed between lens 108 and IR detector 110. As an example, spacers 106 may provide high thermal conductance (e.g., made of aluminum or copper) and may be precisely made to properly align various components. Specifically as an example, spacers 106 may be designed to align lens 108 to IR detector 110 to provide proper z-focus and x/y alignment, such that no additional alignment mechanism is required and no further alignment adjustments need to be made between lens 108 and IR detector 110.

Spacers 106 may be proportioned such that their width, for example, provides proper spacing for shutter 104, lens 108, and IR detector 110. Spacer 106(1) and/or spacer 106(2) may also be designed so that at least a portion of lens 108 and/or IR detector 110 fits within the corresponding spacer(s) 106 to provide proper alignment and to further secure the component within housing 102. For example, IR detector 110 may have one or more surfaces designed to fit snugly against spacer 106(2).

Lens 108 may represent, for example, a single lens element (e.g., a chalcogenide glass lens). Alternatively, lens 108 may represent more than one lens element with appropriate spacers 106 to provide appropriate lens spacing between the lens elements. Insulator 112 is optional and may represent, for example, a low thermal conductive spacer (e.g., a spacer ring made of plastic) to provide insulation for IR detector 110 from thermal heating from various components (e.g., electronic circuits or electronic boards mounted near IR detector 110). Insulator 112 may also optionally be secured within housing 102 via adhesive or alignment pins 118 to secure the various components within housing 102.

IR detector 110 may represent a conventional vacuum package that contains an IR sensor (e.g., any type of IR radiation detecting device). As an example, the IR sensor may be based on a microbolometer structure, which is typically fabricated on a monolithic silicon substrate to form an array of microbolometers, with each microbolometer functioning as a pixel to produce a two-dimensional image. The change in resistance of each microbolometer is translated into a time-multiplexed electrical signal by circuitry known as the read out integrated circuit (ROIC).

The combination of the ROIC and the microbolometer array are commonly known as a microbolometer focal plane array (FPA), which is within IR detector 110 (e.g., an IR detector ceramic vacuum package). One or more pins 111, for example, may be formed as part of IR detector 110 to transfer data, power, control, and/or communication signals between IR detector 110 and other electrical circuits (e.g., memory, processor, etc.) formed as part of or separate from IR camera 100, as would be understood by one skilled in the art.

FIG. 2 shows a block diagram illustrating an IR camera 200 in accordance with one or more embodiments of the present invention. IR camera 200 is similar to IR camera 100 (FIG. 1) and may represent, for example, a cross-sectional assembled side view of IR camera 100.

IR camera 200 is shown in FIG. 2 with shutter 104, spacers 106, lens 108, IR detector 110, and insulator 112 assembled within housing 102. IR camera 100 may further include a heat spreader 202 (e.g., a high thermal conductive heat spreader and/or heat sink), which for example is secured to IR detector 110 and spacer 106(2) and may also function to retain IR detector 110 within housing 102.

As shown in FIG. 2 and as noted above, shutter 104 may be disposed in various optional positions within housing 102. For example, shutter 104 (specifically referenced as shutter 104(1)) may be positioned in front of lens 108, with lens 108 between shutter 104(1) and IR detector 110. Alternatively, shutter 104 (specifically referenced as shutter 104(2)) may be positioned between lens 108 and IR detector 110.

As further illustrated in FIG. 2, the various components may be adjacent to each other or may be designed to fit at least partially within neighboring components. For example, spacers 106(1) and 106(2) may be designed to form a tight fit against lens 108 and may be further designed to allow at least a portion of lens 108 to be enclosed within spacer 106(1) and/or spacer 106(2). Similarly, spacer 106(2), head spreader 202, and insulator 112 may be designed to form a tight fit against IR detector 110 and may be further designed to allow at least a portion of IR detector 110 to be enclosed within spacer 106(2) and/or insulator 112. Depending upon the desired position of shutter 104, shutter 104 may be situated at least partially within spacer 106(1) or spacer 106(2), as shown in FIG. 2.

Figure 3:
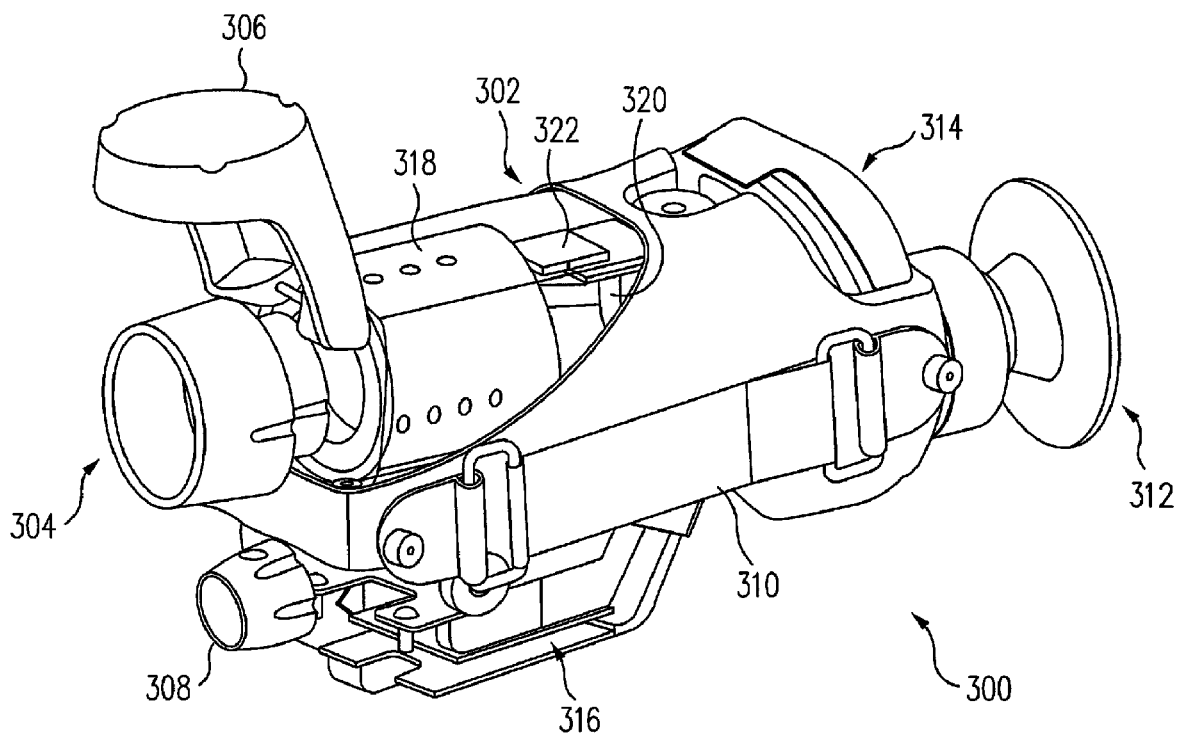
FIG. 3 shows a diagram illustrating an infrared camera system, including the infrared camera of FIG. 1, in accordance with an embodiment of the present invention.

FIG. 3 shows a diagram illustrating an exemplary IR camera system 300 in accordance with an embodiment of the present invention. IR camera system 300 represents an example of an IR application incorporating an embodiment of IR camera 100 or IR camera 200.

Specifically, IR camera system 300 includes an IR camera 318 (e.g., an exemplary embodiment of IR camera 100 or 200) along with associated optics 304 (e.g., optional secondary optics, filter, lens, or lens barrel) and electronics 316 within a housing 302. Electronics 316 (e.g., a microprocessor, memory, power management, and/or display circuitry) may be coupled to IR camera 318 (e.g., at pins 111 as shown in FIGS. 1 and 2 or at an interface connector 512 discussed in reference to FIG. 5) via a connector 322 and leads 320. Electronics 316 may also be coupled to a display 312 (e.g., eyepiece display) for displaying IR image data from IR camera 318 to a user of IR camera system 300 (e.g., by the user viewing display 312 through one eye positioned near display 312).

Optics 304 may optionally have a cover 306 that rotates down to cover and protect optics 304 when IR camera system 300 is not in use. One or more control knobs 308 (e.g., a user control knob) may be provided to be used to control, adjust, and/or select various functions of IR camera 300 (e.g., mode selection, image snapshot, and digital zoom). A strap 310 (e.g., a carrying strap) may also be secured to camera housing 302 to assist a user in holding and carrying IR camera system 300.

A battery compartment 314 may also be included within IR camera system 300 to provide power and allow IR camera system 300 to be portable. Housing 302, functioning as the structural skeleton or shell of IR camera system 300, may optionally provide built-in mechanical features for aligning and securing IR camera 318 using pin holes 116, alignment pins 118, and housing 102.

Figure 4:
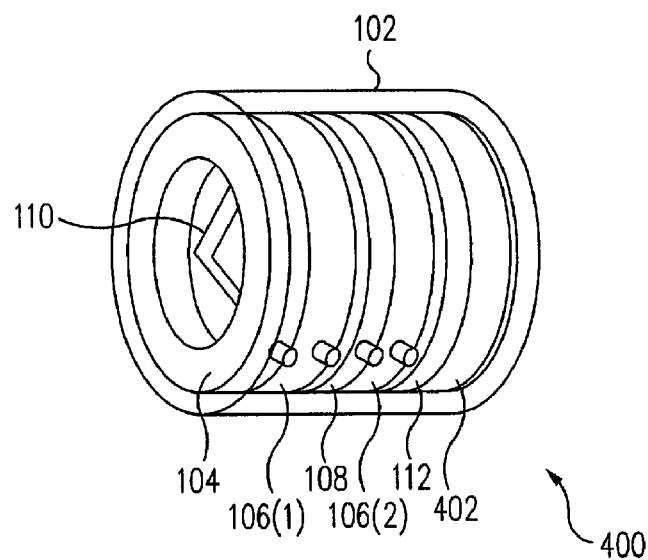
FIG. 4 shows a block diagram illustrating an infrared camera in accordance with one or more embodiments of the present invention.

FIG. 4 shows a block diagram illustrating an exemplary IR camera 400 in accordance with one or more embodiments of the present invention. IR camera 400 is similar to IR camera 100 (or IR camera 200), but further includes one or more processing electronics 402.

For example, processing electronics 402 may represent one or more circuit boards (or other forms of circuitry) to provide processing of IR image data from IR detector 110, storage of the IR image data, and/or provide camera timing, control, and/or biasing signals to IR detector 110. Processing electronics 402 may perform, as an example, one or more of the functions of electronics 316 (FIG. 3). Furthermore, processing electronics 402 may be secured within housing 102 by adhesive and/or alignment pins 118, as discussed similarly in reference to FIG. 1. Alternatively, processing electronics 402 may be securely coupled to insulator 112 and/or housing 102 by various conventional techniques.

Figure 5:
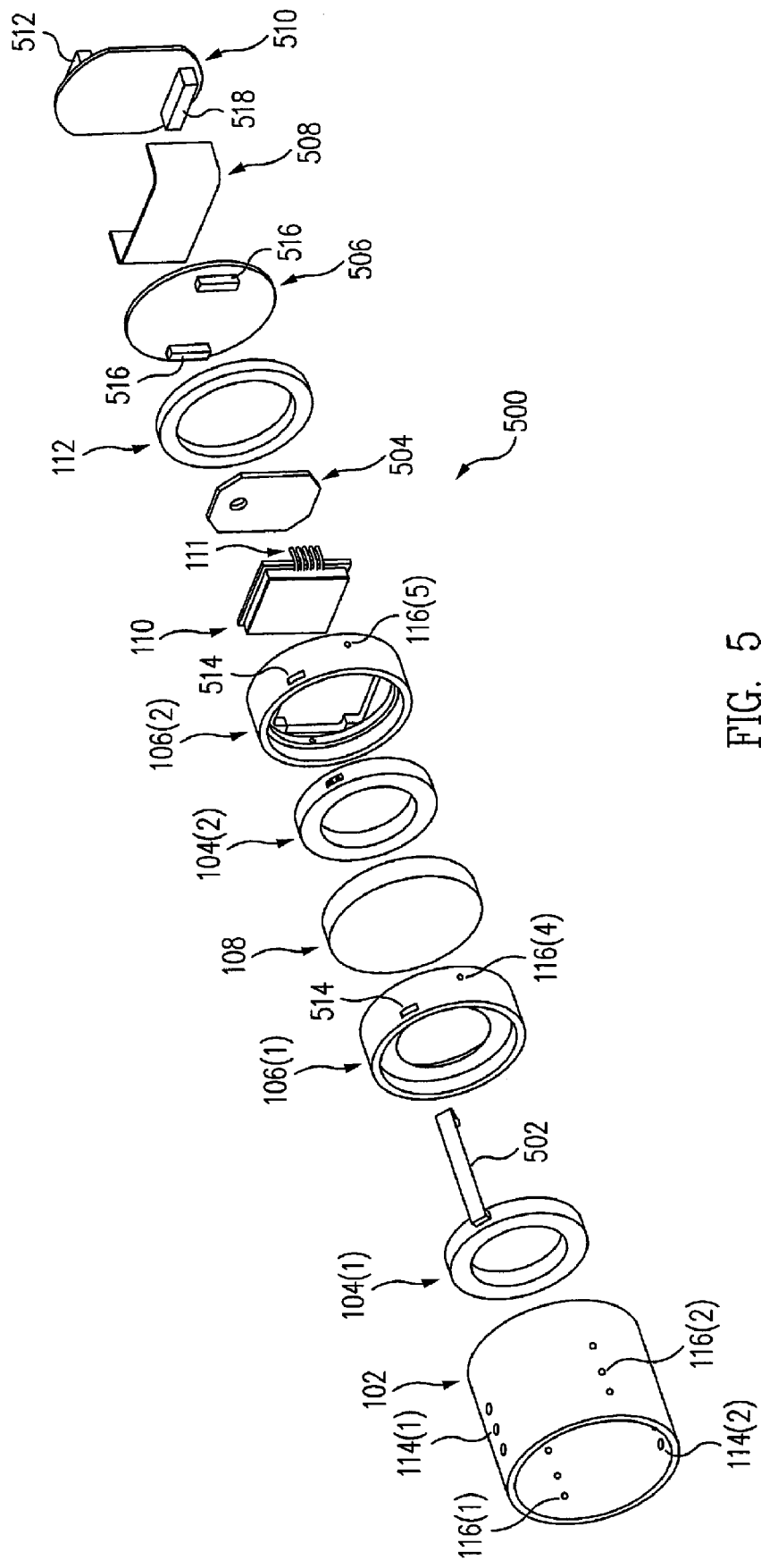
FIG. 5 shows a block diagram illustrating an exploded view of an infrared camera in accordance with an embodiment of the present invention.

For example, FIG. 5 shows a block diagram illustrating an exploded view of an IR camera 500 in accordance with an embodiment of the present invention. IR camera 500 is similar to IR camera 100 (FIG. 1) and IR camera 200 (FIG. 2) and therefore the description of similar features will not be repeated. However, certain aspects of IR camera 500 may be incorporated into IR camera 100 or 200 as desired depending upon the application or requirements.

IR camera 500 includes a cable 502, a heat spreader 504, a circuit board 506, a heat sink 508, and an interface board 510. Cable 502 may represent an electrical flat cable for providing shutter power and control signals between circuit board 506 and shutter 104 (e.g., positioned as shutter 104(1) or shutter 104(2)). An opening 514 in spacer 106 (e.g., spacer 106(1) for shutter 104(1) or spacer 106(2) if shutter 104(2) is the selected position for shutter 104) may be provided to permit cable 502 to connect to shutter 104 by passing through spacer 106. A cutout (not shown) on an inner surface of housing 102 may be provided to provide space for cable 502 to be routed to circuit board 506.

Shutter 104(2) represents an alternative position for shutter 104(1) as only one shutter is generally required for IR camera 500. The location of shutter 104 may be at an optical aperture stop, which may vary depending upon the lens and camera configuration.

Heat spreader 504 (e.g., which may be similar to heat spreader 202) may represent a highly-conductive heat spreader for uniform temperature distribution across IR detector 110 (e.g., IR detector vacuum package). For example, heat spreader 504 may be made of copper or beryllium copper or other conventional materials. Heat spreader 504 may further retain IR detector 110 to spacer 106(2).

Circuit board 506 may represent a processing and shutter printed circuit board, with the various integrated circuits (not shown) on circuit board 506 positioned on the side facing heat sink 508. For example, heat sink 508 may be in contact with hot components on circuit board 506 to remove and channel heat from within housing 102 and away from IR detector 110. Heat sink 508 may be made of copper or beryllium copper, for example, and provide a highly-conductive heat spreader and heat sink for electrical components on circuit board 506 and interface board 510 (e.g., attached to heat sink 508 with conductive adhesive). Insulator 112 may provide further isolation of IR detector 110 from circuit board 506 by acting as a heat insulator and board spacer.

Circuit board 506 may include one or more connectors 516. For example, two connectors 516 may be implemented to connect to pins 111 of IR detector 110. Circuit board 506 may further implement one connector 516 (e.g., not shown, but on the backside facing heat sink 508) to connect to cable 502 from shutter 104. Thus, circuit board 506 may include integrated circuits to support, for example, shutter 104 and IR detector 110.

Interface board 510 may represent a power supply and external interface board and may include one or more connectors. For example, interface board 510 may include an external interface 512 for connecting IR camera 500 to external components. For example, IR camera 500 may be incorporated into IR camera system 300 (e.g., in place of IR camera 318), with external interface 512 connecting to connector 322 and leads 320. Interface board 510 may further include a connector 518 to connect to connector 516 on circuit board 506 (e.g., one of connectors 516 (not shown) on the backside facing interface board 510). Thus, power, data, control signals, and other information may be routed between IR detector 110 and circuit board 506, interface board 510, and external devices (not shown), as required for the specific implementation and application.

Figure 6:
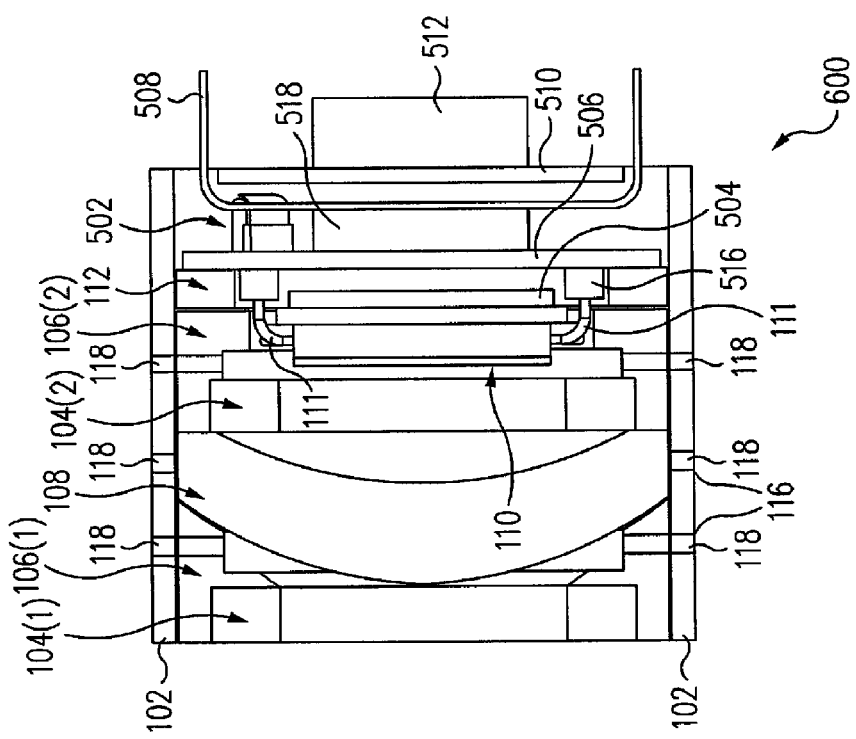
FIG. 6 shows a block diagram illustrating a cross-section of an infrared camera in accordance with one or more embodiments of the present invention.

FIG. 6 shows a block diagram illustrating an IR camera 600 in accordance with one or more embodiments of the present invention. IR camera 600 is similar to IR camera 500 (FIG. 5) and may represent, for example, a cross-sectional assembled side view of IR camera 500.

IR camera 600 is shown with the various components (e.g., shutter 104, spacers 106, lens 108, IR detector 110, heat spreader 504, insulator 112, circuit board 506, heat sink 508, and interface board 510) assembled within housing 102. IR camera 600 may be assembled in a number of different ways and also depending upon the location of shutter 104 (e.g., located as shutter 104(1) or shutter 104(2)).

For example, shutter 104 (as shutter 104(2)) may be secured to spacer 106(2) and cable 502 connected to shutter 104 through opening 514 of spacer 106(2). IR detector 110 is secured to spacer 106(2) using heat spreader 504 (e.g., with adhesive or other conventional mechanical retainers, such as with screws, pins, clips, or other conventional securing techniques, as would be understood by one skilled in the art). Spacer 106(2) with the secured components may be placed within housing 102. Lens 108 is also placed within housing 102, within spacer 106(1) and/or spacer 106(2). Shutter 104 (as shutter 104(1)) may be secured to spacer 106(1), as discussed above for spacer 106(2), if shutter 104 is located as shutter 104(1). The various components may be aligned within housing 102 using alignment pins 118 through pin holes 116 and adhesive may be dispensed through adhesive holes 114. Insulator 112, circuit board 506, heat sink 508, and interface board 510 may then be mounted within housing 102 (e.g., with adhesive and/or mechanical retainers or with alignment pins as discussed above), with cable 502 and other electrical connections completed.

Figure 7:
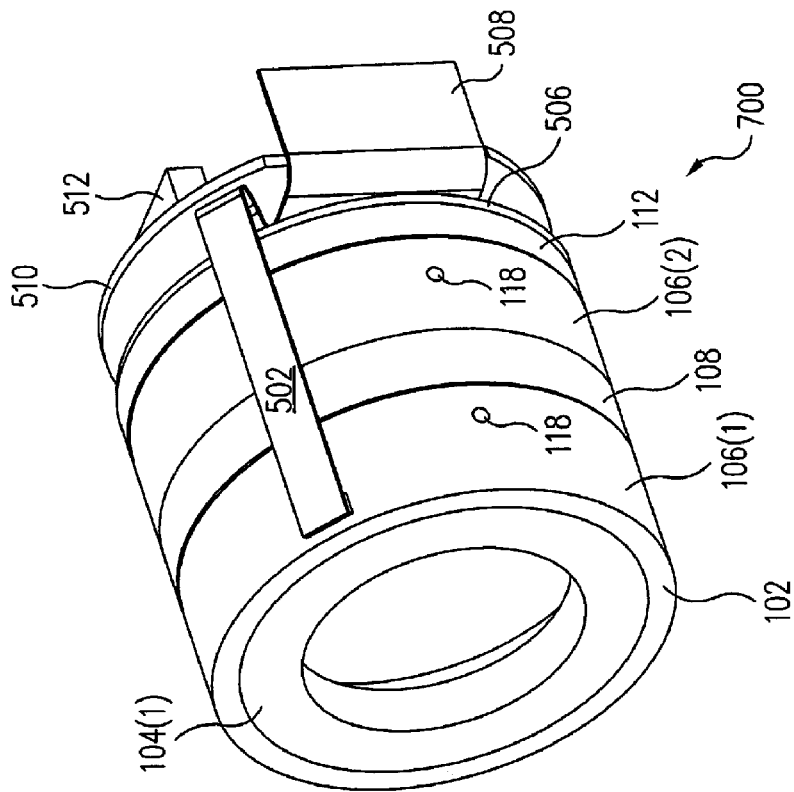
FIG. 7 shows a block diagram illustrating an infrared camera in accordance with one or more embodiments of the present invention.

FIG. 7 shows a block diagram illustrating an IR camera 700 in accordance with one or more embodiments of the present invention. IR camera 700 is similar to IR camera 600 (FIG. 6) and may represent a perspective view of an assembled IR camera 600. Housing 102 is shown in a transparent fashion to clearly show the various assembled components. FIG. 7 also illustrates cable 502 routed within housing 102, such as along a cutout of an inner surface of housing 102 to provide a path and sufficient space for cable 502.

Systems and methods are disclosed herein to provide improved techniques for assembling and packaging IR camera components. For example, in accordance with an embodiment of the present invention, an IR camera is disclosed having a housing for various IR camera components that provides a more compact form (e.g., reduced stack-up between the optics and the IR detector). The optic tolerances and components may be designed to fit together such that fewer adjustments, focusing, and fine tuning are required, as compared to conventional IR camera manufacturing.

The diameter of the housing may be minimized and fewer components (e.g., fewer heat sinks) and fasteners (e.g., screws, bolts, and other mounting and fastening hardware) may be required to secure the various components within the housing. The various components within the housing may be aligned directly with each other or one or more components may fit at least partially within each other. Furthermore, the housing may thermally protect the various components to provide a low thermally conductive outer shell, while the various components within may provide a high thermal conductance to maintain a substantially uniform temperature with the IR detector.

In general in accordance with one or more embodiments of the present invention, IR camera systems and manufacturing techniques are disclosed that provide an assembly that may reduce the time and labor involved as compared to conventional techniques. Furthermore, thermal dynamic improvements may be achieved with the lens and various other components at approximately the same temperature as the IR detector (e.g., vacuum package) to minimize out-of-field thermal radiation affects and to reduce the affects of electronic heating to the IR detector.

Embodiments described above illustrate but do not limit the invention. It should also be understood that numerous modifications and variations are possible in accordance with the principles of the present invention. Accordingly, the scope of the invention is defined only by the following claims.

What is claimed is:

1. An infrared camera comprising;
    a housing having a first end and a second end and a hollow body disposed between the first end and the second end, wherein the hollow body has a plurality of holes;
    a shutter disposed within the housing;
    a lens disposed within the housing;
    an infrared detector disposed within the housing; and
    a first spacer disposed within the housing and between the lens and the infrared detector, wherein the first spacer is secured within and to the hollow body of the housing by an adhesive and/or an alignment pin disposed in corresponding one or more of the holes.

2. The infrared camera of claim 1, wherein the lens is disposed between the shutter and the infrared detector, with the first spacer configured to align the lens with the infrared detector within the housing.

3. The infrared camera of claim 1, further comprising:
    a heat spreader disposed within the housing and coupled to the infrared detector;
    a circuit board disposed within the housing and coupled to the infrared detector and the shutter;
    a cable disposed within the housing and adapted to couple the shutter to the circuit board to provide power and control signals from the circuit board to the shutter; and
    an insulator disposed within the housing and between the circuit board and the infrared detector.

4. The infrared camera of claim 3, wherein the insulator is secured within and to the housing by the adhesive disposed in one or more of the holes, and wherein the housing has a cutout within its inner surface to accommodate the cable within the housing.

5. The infrared camera of claim 3, further comprising:
an interface board, disposed at least partially within the housing and coupled to the circuit board, configured to couple to devices external to the housing; and
a heat sink disposed at least partially within the housing and between the interface board and the circuit board.

6. The infrared camera of claim 1, wherein the infrared camera is incorporated into an infrared camera system further comprising a display configured to display information provided by the infrared detector.

7. The infrared camera of claim 1, further comprising a second spacer disposed within the housing and between the lens and the shutter, wherein the first spacer and the second spacer are secured within and to the hollow body of the housing by the adhesive disposed in one or more of the holes.

8. The infrared camera of claim 1, wherein the housing comprises a plastic tube to provide a low thermal conductivity and thermally interconnect at least the lens and the first spacer.

9. The infrared camera of claim 1, further comprising alignment pins disposed within at least a first set of the holes and into at least one of the shutter and the first spacer to align within the housing.

10. The infrared camera of claim 1, further comprising:
an insulator disposed within the housing adjacent to the infrared detector, wherein the insulator is secured within and to the housing by the adhesive disposed in one or more of the holes; and
a second spacer disposed within the housing and between the lens and the shutter, wherein the first spacer and the second spacer are secured within and to the hollow body of the housing by the adhesive disposed in one or more of the holes.

11. An infrared camera comprising:
a shutter;
a lens;
an infrared detector;
at least one spacer adapted to align the lens and the shutter with the infrared detector;
a heat spreader coupled to the infrared detector;
means for housing the shutter, the lens, the infrared detector, the at least one spacer, and the heat spreader, wherein the housing means comprises a low thermal conductive material to thermally interconnect at least the lens and the at least one spacer, and wherein the housing means further comprises a hollow body having a plurality of holes; and
means for securing the at least one spacer within and to the hollow body of the housing means via one or more of the holes.

12. The infrared camera of claim 11, further comprising:
a circuit board disposed within the housing means and coupled to the infrared detector and the shutter;
an insulator disposed within the housing means and between the circuit board and the infrared detector;
an interface board, disposed at least partially within the housing means and coupled to the circuit board, configured to couple to devices external to the housing means; and
a cable disposed within the housing means and adapted to couple the shutter to the circuit board to provide power and control signals from the circuit board to the shutter, wherein the housing means has a cutout within an inner surface of the hollow body to accommodate the cable within the housing; and a heat sink disposed at least partially within the housing means and between the interface board and the circuit board.

13. The infrared camera of claim 11, wherein the lens is disposed between the shutter and the infrared detector.

14. The infrared camera of claim 11, wherein the at least one spacer comprises:
a first spacer adapted to align the lens with the infrared detector; and
a second spacer adapted to align the shutter with the lens and the infrared detector.

15. The infrared camera of claim 11, wherein the securing means comprises an adhesive.

16. The infrared camera of claim 11, wherein the housing means and the least one spacer align in x, y, and z coordinates the lens and the shutter with the infrared detector.

17. The infrared camera of claim 11, wherein the infrared camera is incorporated into an infrared camera system further comprising a means for displaying information provided by the infrared detector.

18. A method of assembling an infrared camera, the method comprising:
providing a housing having a first end and a second end and a hollow body joining the first end to the second end, wherein the hollow body has a plurality of holes;
inserting a shutter into the housing;
inserting a lens into the housing;
inserting an infrared detector into the housing;
inserting at least one spacer into the housing; and
dispensing an adhesive into one or more of the holes to secure the shutter, the lens, the at least one spacer, and the infrared detector within and to the hollow body of the housing.

19. The method of claim 18, further comprising inserting at least one alignment pin into at least one of the holes to align the at least one spacer within the housing.

20. The method of claim 18, wherein the infrared detector is secured to a first one of the at least one spacers before the inserting of the infrared detector and the first spacer into the housing.

21. The method of claim 18, wherein the housing comprises a plastic tube to provide a low thermal conductivity and thermally interconnect at least the lens and the at least one spacer.

22. The method of claim 18, further comprising:
inserting a heat spreader into the housing, adjacent to the infrared detector;
inserting a circuit board at least partially into the housing;
inserting a cable within the housing to couple the shutter to the circuit board to provide power and control signals from the circuit board to the shutter, and wherein the housing has a cutout within its inner surface to accommodate the cable within the housing; and
inserting an insulator into the housing, between the circuit board and the infrared detector.

23. The method of claim 22, further comprising;
inserting an interface board at least partially into the housing; and inserting a heat sink at least partially into the housing between the interface board and the circuit board.

24. The method of claim 18, wherein the lens is disposed within the housing between the shutter and the infrared detector, and wherein the at least one spacer comprises:
   a first spacer adapted to align the lens with the infrared detector; and
   a second spacer adapted to align the shutter with the lens and the infrared detector;
   wherein the housing and the first and second spacers align in x, y, and z coordinates the lens and the shutter with the infrared detector.

* * * * *